(12) United States Patent
Sheeran et al.

(10) Patent No.: US 6,429,557 B2
(45) Date of Patent: Aug. 6, 2002

(54) TERMINAL CONNECTOR AND WIRE CONTAINMENT APPARATUS

(75) Inventors: Kent Sheeran, Festus; Payman Rassoolkhani, Maryland Heights, both of MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/790,465

(22) Filed: Feb. 22, 2001

Related U.S. Application Data

(63) Continuation of application No. 09/422,831, filed on Oct. 21, 1999.

(51) Int. Cl.[7] .............................................. H02K 11/00
(52) U.S. Cl. ............................ 310/71; 310/91; 310/270
(58) Field of Search ........................... 310/89, 91, 71, 310/43, 254, 270; 29/596–598

(56) References Cited

U.S. PATENT DOCUMENTS

| | | |
|---|---|---|
| 3,002,119 A | 9/1961 | Lindstrom |
| 3,483,392 A | 12/1969 | Schuler |
| 3,772,544 A | 11/1973 | Wrobel |
| 3,984,712 A | 10/1976 | Hill |
| 4,061,935 A | 12/1977 | Kandpal |
| 4,197,476 A | 4/1980 | Lund et al. |
| 4,616,149 A | 10/1986 | Best |
| 4,620,425 A | 11/1986 | O'Grady |
| 4,734,602 A | 3/1988 | Hauser et al. |
| 4,851,725 A | 7/1989 | Keck |
| 5,175,458 A | 12/1992 | Lemmer et al. |
| 5,717,273 A | 2/1998 | Gulbrandson et al. |
| 6,043,584 A | 3/2000 | DeHart |

FOREIGN PATENT DOCUMENTS

| | | |
|---|---|---|
| DE | 36 25 109 A1 | 7/1986 |
| DE | 41 24 327 A1 | 7/1991 |
| FR | 2 256 573 | 12/1974 |
| JP | 02101940 | 4/1990 |
| JP | 04355638 | 12/1992 |
| JP | WO 93/21681 | 4/1993 |
| JP | 09322458 | 12/1997 |

*Primary Examiner*—Tran Nguyen
(74) *Attorney, Agent, or Firm*—Thompson Coburn LLP

(57) ABSTRACT

A shroud is provided for a dynamoelectric device such as an electric motor comprising a rotor and a wire wound stator, where the shroud fully contains the end turns of the stator wire windings, provides terminal connections for winding leads, and includes a circuitry compartment to house a temperature and current protective device.

23 Claims, 3 Drawing Sheets

TERMINAL CONNECTOR AND WIRE CONTAINMENT APPARATUS

RELATED APPLICATION DATA

This application is a continuation of application Ser. No. 09/422,831, filed Oct. 21, 1999, now pending.

BACKGROUND OF THE INVENTION

(1) Field of the Invention

This invention relates generally to dynamoelectric devices, such as electric motors, and more particularly to the stator construction of the device where the stator assembly consists of a stator having a center bore with a plurality of stator poles circumferentially spaced around the center bore. The stator poles have wiring wrapped in windings around the stator poles and the windings have end turns arranged around the stator center bore at axially opposite sides of the stator. The end turns of the windings are laced and manually positioned at opposite ends of the stator to prevent their interference with the rotor assembly in the stator center bore, the motor housing, and/or with the end plates of the motor housing.

(2) Description of the Related Art

In a traditional dynamoelectric device such as a motor, the stator consists of a plurality of stator poles surrounding a rotor. Devices like this are well known in the art, and one is shown generally in FIG. 1. Because such devices are well known, their assembly is only generally discussed here. The stator can be a collection of individual poles as in a segmented stator, or can be formed together as a single unit. As shown in FIG. 1, the stator poles 10, generally, have a "I"-shaped cross-section, which creates two channels on opposite sides of a central member 12 or web of the "I"-shaped cross section. A length of wire is wrapped around the central member of the "I"-shaped cross-section forming wire windings 14 that are partially contained within the channels on opposite sides of the central member 12. Where the wire winding exits one channel at an end of the stator pole 10, crosses over the central member 12, and is redirected to enter the channel on the opposite side of the central member 12, the wire winding creates an end turn 16.

End turns 16 of the wire windings 14 are created at both axial ends of each stator pole. At times windings are formed with the end turns 16 positioned at an axial distance from the opposite ends of the stator pole 10 to provide a smooth transition as they wrap around the end of the stator pole from one channel to the other channel. At this distance from the stator pole, the end turns are grouped and bound together with laces 18. Grouping wire windings 14 with laces 18 prevents the wire windings from interfering with subsequent assembly operations. Generally, materials such as insulated tape or common nylon electrical tie wraps are used as laces 18. After winding, the stator assembly is assembled into a housing 20, a rotor assembly (not shown) is inserted into the stator center bore, and end plates or end bells (not shown) are assembled over the opposite ends of the housing with the rotor shaft supported by bearings in each of the end plates.

There are many methods of motor construction, and the method described herein and shown in FIG. 1, demonstrates one technique where the inside of the housing 20 is fitted to the outer wall of the stator assembly 22. By lacing the end turns 16, the wire windings 14 are prevented from accidentally fouling areas adjacent to the stator poles where the housing 20, rotor assembly (not shown), or end plates (not shown) are installed. As the stator is wound, winding leads 24 are brought from the wire windings 14 around the stator pole for connection outside the stator assembly 22. The winding leads provide current input to the stator poles 10 for the development of electromotive force, and the winding leads 24 provide connection for other electrical switching devices used to regulate current and stator controls. Winding leads 24 must be sized in length for the particular connection to be made outside the stator assembly 22, and the winding leads are often color coded to provide assembly personnel a reference during connection to external devices.

This method of stator construction has many shortcomings. Lacing the end turns 16 and grouping the winding leads 24 is a manually intensive operation, requiring significant manipulation of the wire windings. The manipulation of wire windings 14 causes quality problems. Moreover, the process of generating winding leads 24 and installing winding lead connectors adds assembly time to motor manufacturing.

Misplaced end turns 16 and wire windings 14 can compromise conductivity in the stator assembly 22. As the end turns 16 are manually positioned to clear areas adjacent to the stator poles 10 for the housing 20, the rotor assembly, or end plate installation, grounding of the wire windings can occur. Generally, the wound stator poles 10 are press fit into the housing 20. During this operation, loose winding wires can be accidentally crimped or damaged against the housing 20. End plates (not shown) are often mechanically fastened to the housing 20. Similarly, during this phase of motor construction, loose winding wires can be accidentally crimped or damaged when the end plates are bolted to the housing. When the rotor assembly (not shown) is installed into the stator assembly bore it is critical that the wire windings 14 and end turns 16 do not foul the interface or air gap between the rotor assembly and the stator assembly bore. Often rotor assembly installation is a blind installation, where the end plates obscure viewing of the rotor assembly. It is important that the wire windings and end turns clear the rotor and shaft of the rotor assembly and the bearing assemblies to be fitted thereon.

Protective sealant is applied to the stator assembly 22 and housing to prevent humidity from damaging the wire windings 14 when the motor is de-energized after a period of operation. The protective sealant also provides electrical insulation for the wire windings 14 from other components and debris. This sealant can become cracked if manual manipulation of the end turns 16 and wire windings 14 is needed when the stator assembly 22 is assembled with the housing, the end shields, and the rotor assembly.

Generation of the winding leads 24 is another manual operation required when winding the stator poles. Winding leads 24 must be properly sized in length after winding to allow proper connection to switching devices outside the stator assembly. The winding leads 24 must be specially marked for terminal points, which vary depending upon customer requirements and motor configuration. The length of the winding leads 24 must be sufficient to allow connection to the terminal points, and the ends of the winding leads 24 must be fitted with connectors. These connectors must be specifically configured for the specific terminal point and connector style required for the customer application. Often, winding leads 24 and connectors are color coded to assist assembly personnel in making proper connections. In the prior art mechanical connectors and shrink caps on winding leads 24 have been used to provide connections to terminal points. However, the preparation of winding leads 24 in this manner creates non-standard interfaces for motor construction. This creates inflexibility in the manufacturing lines and slows overall motor production rates.

The winding leads 24 and the connectors attached thereon are frequently used during inspection and testing. Manual connection and disconnection at these points during this phase of the manufacturing process is also labor-intensive. Quality can be compromised as protective sealant is sometimes damaged from the areas of the leads where connection and re-connection was made.

The problems set forth above could be overcome by a device that attaches to the stator assembly 22 of the motor and contains the winding leads 24 and end turns 16 therein, thus eliminating manual lacing of the winding end turns. The device would also have a terminal container to provide uniform connector styles for winding leads. Additionally, the device would be provided with a compartment for housing protectors such as temperature and current overload circuitry.

SUMMARY OF THE INVENTION

The shortcomings of the prior art of FIG. 1 are overcome by the present invention which provides a device that contains the end turns of a stator and provides a convenient mechanism for the connection of winding leads of the stator. In general, the invention will be used on the stator assembly such as that shown in FIG. 1, comprising a plurality stator poles, which are wound with wire and arranged in a cylindrical orientation to create an outer diameter adapted for accepting a housing and an inner diameter shaped to accept a rotor assembly (not shown). The wire windings will have end turns positioned at the opposite axial ends of the stator poles. Comprised with the wire windings are the winding leads.

FIG. 4 shows the apparatus of the invention installed on one end of a stator such as that shown in FIG. 1 and described earlier. It should be understood that this particular stator shown and described is only one illustrative environment in which the apparatus of the invention may be employed. The apparatus may be employed with other types of stators. Furthermore, the description of the apparatus to follow is not intended to limit the combinations of configurations of the invention, but to describe the most detailed embodiment. Depending upon style of dynamoelectric device and customer requirements, certain features of the invention can be eliminated without departing from the scope of the invention.

The apparatus of the invention comprises a generally circular shroud that has a "U" shaped cross-section. In the preferred embodiment, the shroud is molded of an insulating plastic, although other materials may be used. The cross section is shaped to entirely contain the end turns and winding leads. The shroud is connected to an axial end of the stator assembly by means of stator slot posts, which are press fit into slots created by adjacent stator poles. Molded to the shroud is a terminal container to which the winding leads are attached. Molded into the shroud is a circuitry compartment that houses current and temperature sensing devices. Above the circuitry compartment is a protector cover to hold the temperature and current sensing devices inside the circuitry compartment. Across the protector cover is a clamp that holds the protector cover to the shroud.

The shroud can be fitted to both axially opposite ends of the stator assembly. When a shroud is fitted to both ends of the stator assembly, it is possible one shroud may be constructed without the terminal container, circuitry compartment, or protector cover.

BRIEF DESCRIPTION OF THE DRAWINGS

Further objectives and features of the invention are revealed in the following detailed description of the preferred embodiment of the invention and in the drawing figures wherein.

DESCRIPTION OF THE PREFERRED EMBODIMENT

Figure 1:
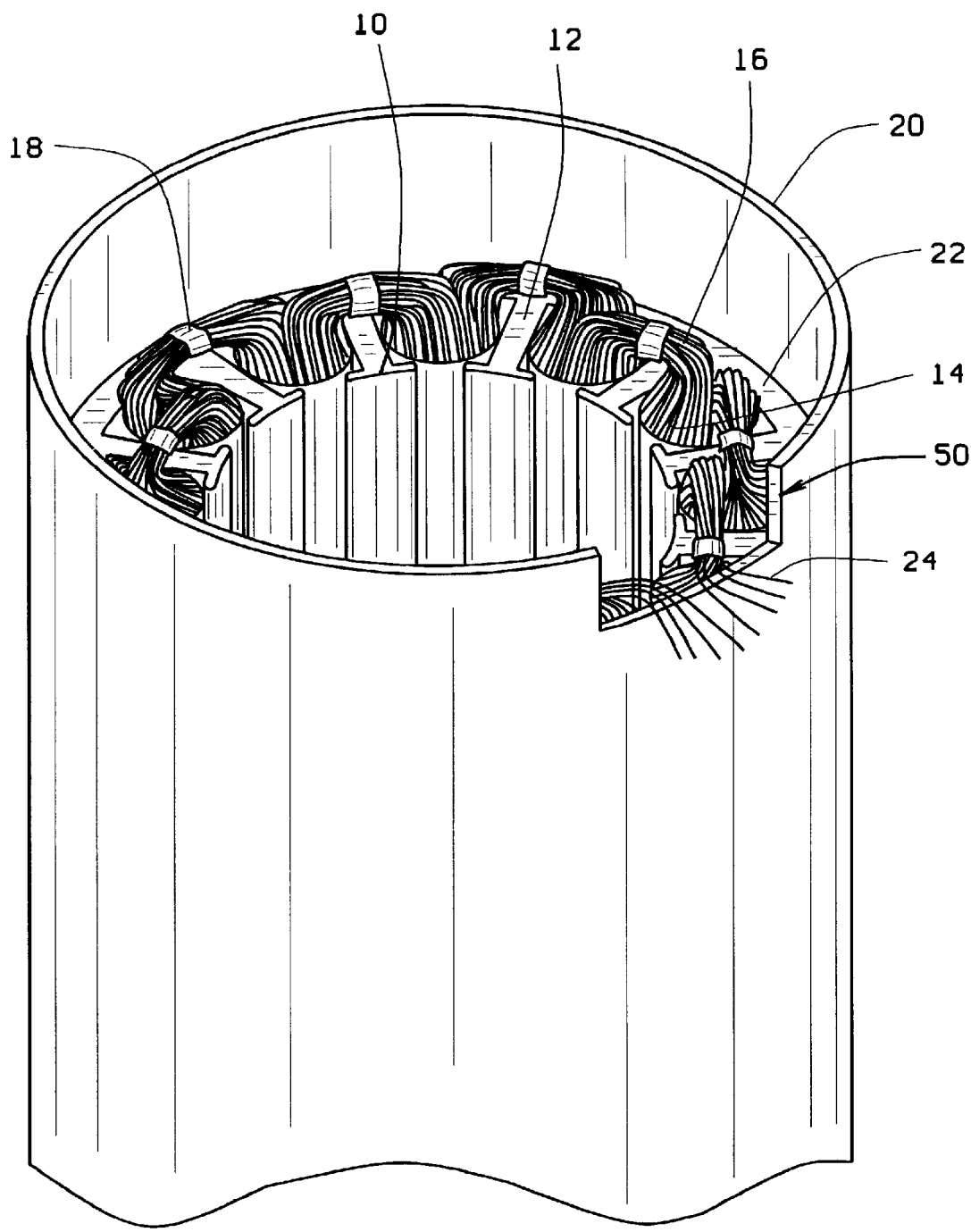
FIG. 1 is an end view of an opened housing, exposing the stator poles and wire windings showing prior art methods of lacing end turns and grouping winding leads.
Figure 2:
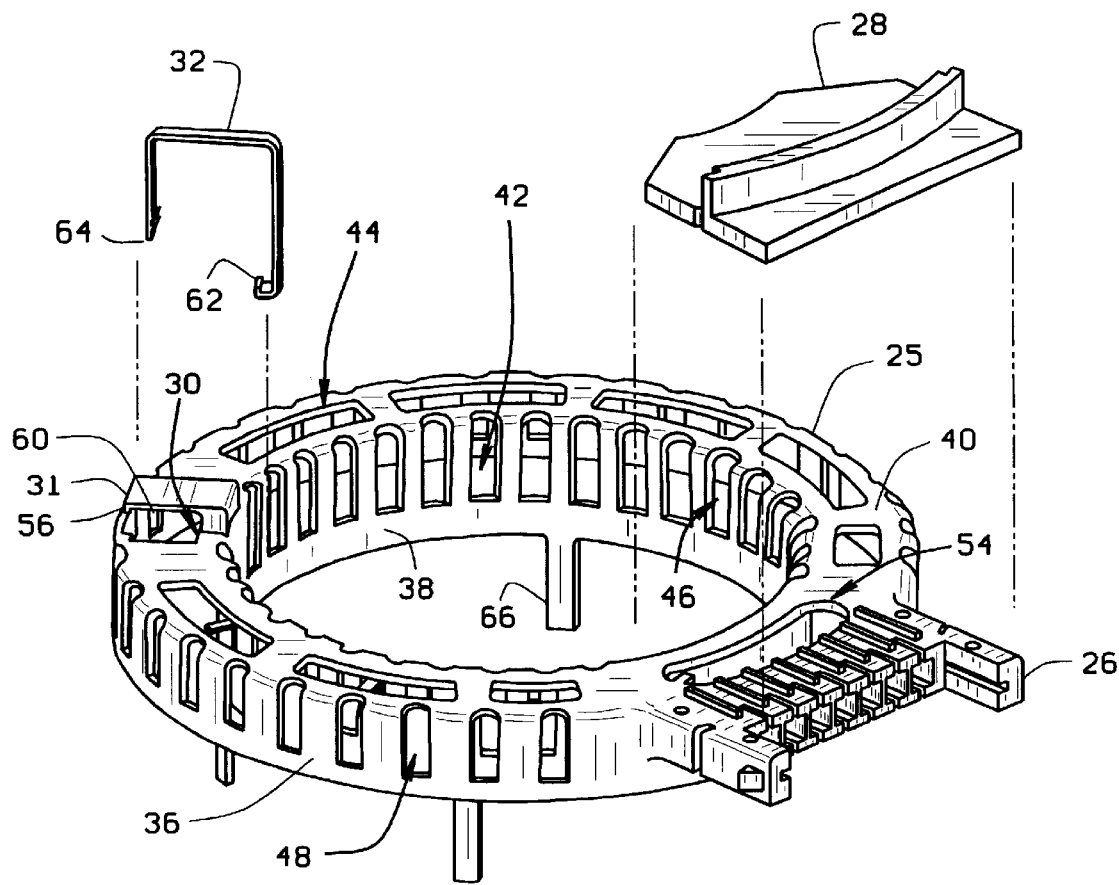
FIG. 2 is an exploded view of the apparatus of the invention.
Figure 3:
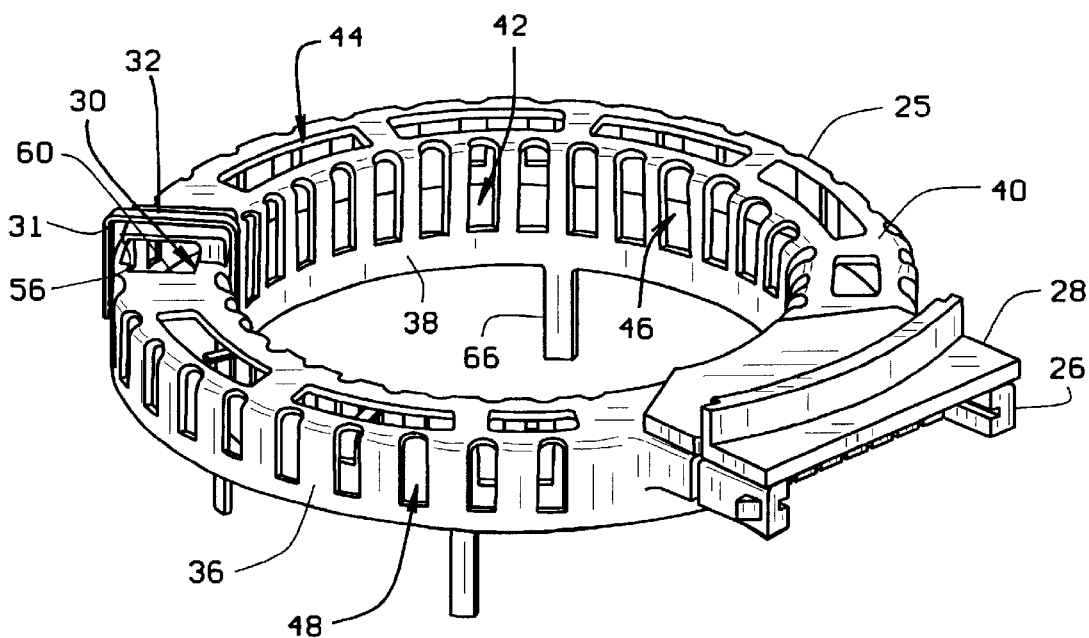
FIG. 3 is an assembled view of the apparatus of the invention.
Figure 4:
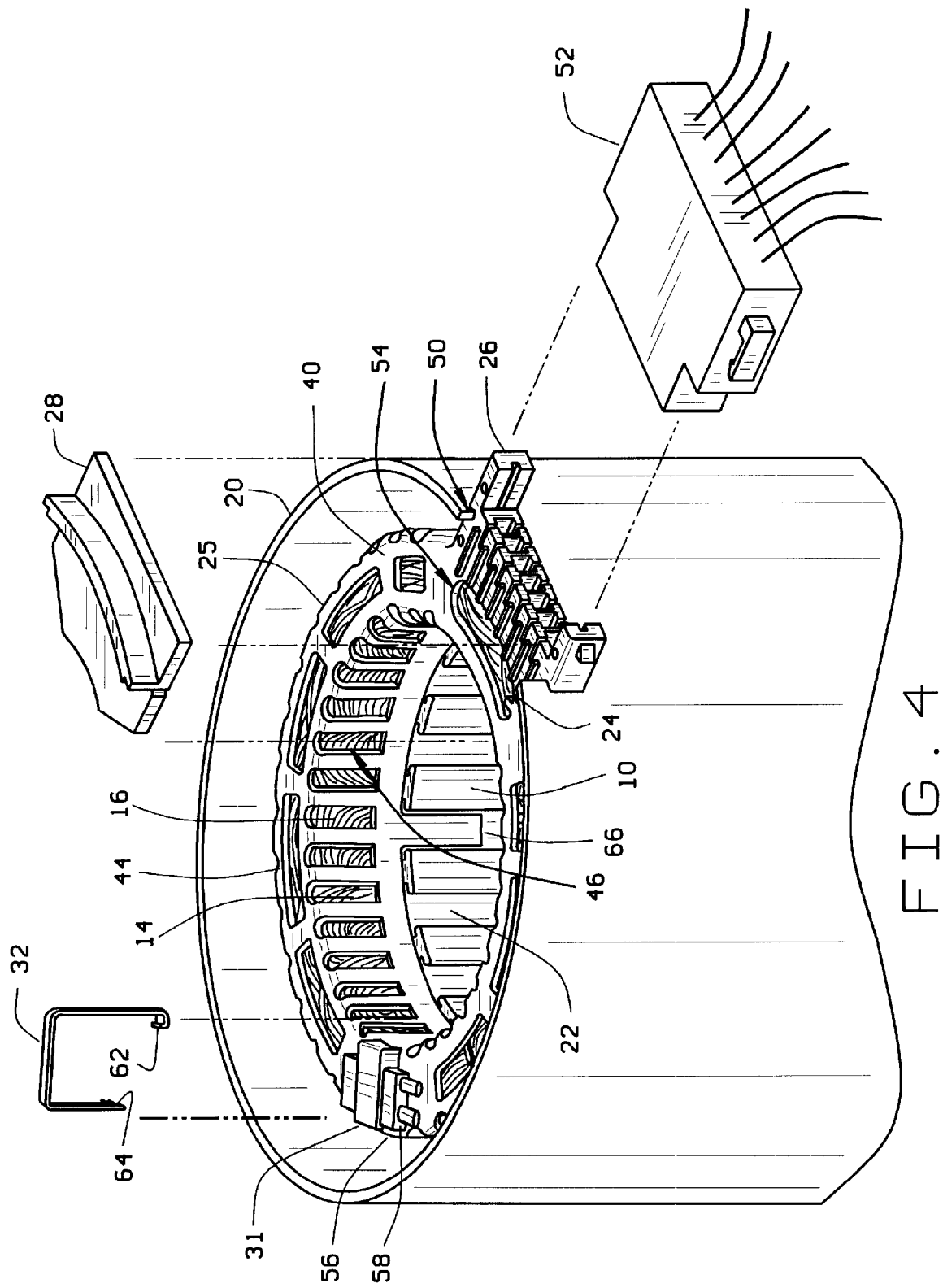
FIG. 4 is a view of the apparatus of the invention fully assembled on the stator assembly of FIG. 1.

FIGS. 2 and 3 show the apparatus of the invention that is basically comprised of a shroud 25 having a terminal container 26, a terminal container top 28, a circuitry compartment 30, a protector cover 31 for the circuitry compartment 30, and a clamp 32 for the protector cover 31. The shroud 25 is made from a high temperature, insulating plastic and is formed with a "U"-shaped cross section. The "U"-shaped cross section of the shroud 25 consists of an outer diameter surface shown as the outer wall 36 and inner diameter surface shown as the inner wall 38. The outer wall 36 and the inner wall 38 are connected via an annular end wall 40. The inner wall 38, outer wall 36, and end wall 40 are molded as an integral piece, and the interior surface of the shroud's "U"-shaped cross section forms an annular channel 42. This annular channel houses the winding leads 24 and end turns 16 shown in FIG. 1. In FIG. 4, the shroud 25 is shown installed on the stator assembly 22 of FIG. 1 with the winding leads 24 and end turns 16 fully contained within the annular channel 42 formed by the interior of the "U"-shaped cross section of the shroud.

In FIGS. 2 and 3, the shroud 25 has a plurality of arcuate slots 44 in the end wall 40. The arcuate slots are radially centered on the end wall and circumferentially spaced in such a manner to provide structural integrity to the shroud 25. The regular pattern of circumferential spacing of the arcuate slots 44 is interrupted in areas adjacent to the circuitry compartment 30 and the terminal container 26. The slots provide the exterior surface of the end wall 40 with communication to the interior of the annular channel 42. These arcuate slots 44 provide cooling paths from the end shields of the motor to the stator assembly 22.

In FIGS. 2 and 3, the inner wall 38 of the shroud 25 is shown with axial slots 46 through the inner wall 38 and partially through the end wall 40. The axial slots 46 are circumferentially spaced about the inner wall 38, providing communication between both the exterior surfaces of the inner wall 38 and end wall 40, and the annular channel 42. These inner wall axial slots 46 provide additional cooling paths from the end shields of the motor to the stator assembly 22. The circumferential spacing of the axial slots 46 is interrupted in areas adjacent to the circuitry compartment 30 and the terminal container 26 to maintain structural integrity of the shroud 25 in these areas.

In FIGS. 2 and 3, the outer wall 36 of the shroud 25 is shown with axial slots 48 through the outer wall 36 and partially through the end wall 40. The axial slots 48 are circumferentially spaced about the outer wall 36, providing communication between both the exterior surfaces of the outer wall 36 and end wall 40, and the annular channel 42. These outer wall axial slots 48 provide additional cooling paths from the end shields of the motor to the stator assembly 22. The circumferential spacing of the axial slots 48 is interrupted in areas adjacent to the circuitry compartment 30 and the terminal container 26 to maintain structural integrity of the shroud 25 in these areas.

FIGS. 2, 3, and 4 show the terminal container 26 integrally molded with the shroud 25. The terminal container 26 is dimensioned to project radially outward from the shroud 25 to a position outside the housing 20 when the shroud 25 is positioned in the housing. In this configuration, the housing is provided with a notch 50 to accommodate the terminal container 26. However, the terminal container 26 may be molded to project axially from the shroud. In that configuration, a notch 50 in the housing 20 need not be provided. Winding leads 24 are directed to the terminal container 26 to facilitate connection to an external apparatus of the motor. The terminal container 26 is rigged with a system of plug and socket quick-disconnects that provides a standard connection system to other components of the motor. As shown in FIG. 4, a single terminal container connector 52 can be used as a standard interface to an external motor apparatus. The terminal container arrangement enables the stator assembly 22 of the motor to be completed in manufacture without the need for winding leads 24 to be sized for a specific terminal point or fitted with a specific connector.

In the shroud, in the area adjacent to the terminal container 26, a terminal container arcuate slot 54 is provided in the end wall 40. The terminal container arcuate slot 54 provides an opening for assembly operators to connect the winding leads 24 of FIG. 1 to the terminal points in the terminal container 26. The terminal container 26 has a terminal container top 28, which forms the external casing of the terminal container 26. When removed, the terminal container top 28 exposes the inside of the terminal container and ports to which winding leads 24 of FIG. 1 can be connected. With the terminal container top 28 removed, assembly operators can connect winding leads to the terminals without a need to color code the ends of winding leads, and without the need to ensure the winding leads have sufficient length to connect to external motor apparatus. After connections are made to the required port inside the terminal container 26, the terminal container top 28 snaps into place to form the external surface of the terminal container 26. The terminal container top 28 can be removed to expose terminal connections and their ports for later testing and inspection without damaging winding leads or the protective sealant affixed thereon.

The circuitry compartment 30 is molded into the shroud 25 as a rectangular slot in the end wall 40. Positioned above the circuitry compartment 30 is a protector cover 31. The protector cover is a resilient member that has an "L"-shaped cross-section as seen in FIG. 2. The "L"-shaped cross section permits the protector cover 31 to span over the circuitry compartment 30 in a radial direction across the end wall 40. With the protector cover 31 having a "L"-shaped cross section, the portion of the cover that spans over the circuitry compartment 30 can be resiliently flexed away from the circuitry compartment a short distance to permit insertion of the protective temperature and current limiting devices in the circuitry compartment. The protector cover 30 is firmly attached to the shroud 25 at the interface of the inner wall 38 and the end wall 40 so as to form an integral unit with the shroud 25. At the interface of the outer wall 36 and the end wall 40, the edge of the protector cover 31 is suspended above the end wall and the circuitry compartment 30. The edge of the protector cover 31 is provided with a lip 56 that engages a side of the protector device 58 and holds it in place. As a rectangular slot in the end wall 40, the circuitry compartment 30 provides communication between the exterior surface of the end wall 40 and the annular channel 42.

As shown in FIG. 4, the circuitry compartment 30 and protector cover 31 serve as a storage location for standard protective temperature and current sensing devices 58. Depending on the particular device intended to be used with the stator, the shape and size of the circuitry compartment would change to accommodate the device. Recessed shoulders 60 are formed inside the circuitry compartment at circumferentially opposite ends of the circuitry compartment. The recessed shoulders 60 provide seating surfaces for the temperature and current sensing devices 58. With this arrangement, the device 58 is held in place inside the circuitry compartment 30 and on top of the recessed shoulders 60 by the protector cover 31, while the opening between the recessed shoulders 60 of the circuitry compartment 30 provides a passage for directing the leads or other types of connections of the temperature and current sensing device 58 into the annular channel 42 and to the windings of the stator. The device 58 can be installed in the shroud 25 by lifting up the protector cover 31 and placing the device in the circuitry compartment 30. Preferably, the device is held in place in the circuitry compartment by the resiliency of the protector cover.

To ensure the positive location of the contents of the circuitry compartment 30, a clamp 32 is used to hold down the suspended edge of the protector cover 31. The clamp 32 is configured in a general "U"-shape and is fully detachable from the shroud 25. The clamp 32 has a hook 62 on one end used to anchor the clamp to the shroud at the exposed edge of the inner wall 38. On the other end, the clamp 32 is configured with a series of barbs 64 that enable the clamp to be anchored to the exposed edge of the outer wall 36.

In FIGS. 2 and 3, a plurality of stator slot posts 66 are shown projecting axially away from the shroud 25. The posts are integral with the shroud and connected at the exposed edge of the inner wall 38. The stator slot posts 66 are circumferentially spaced so as to engage inside several of the slots between the stator poles on the stator assembly 22. The length of the stator slot posts 66 is determined to provide radial support and alignment of the shroud 25 with the stator assembly 22. The radial thickness of the stator slot posts is set so as not to interfere with the stator bore or the annular channel 42.

While the present invention has been described by reference to a specific embodiment, it should be understood that modifications and variations of the invention may be constructed without departing from the scope of the invention defined in the following claims.

What is claimed:

1. A dynamoelectric device comprising:

a stator having a center bore with a center axis extending between axially opposite ends of the stator, a plurality of stator poles circumferentially spaced around the center bore, the stator poles having wiring wrapped in windings around the stator poles and the windings having end turns arranged around the stator center bore at the axially opposite ends of the stator;

a shroud attached to one of the ends of the stator, the shroud extending around the stator center bore and having a generally U-shaped cross section that covers over the end turns of the windings;

a terminal container being integrally molded with the shroud and the windings having leads that are mounted in the terminal container and a terminal container top removably attached to the terminal container and covering over the winding leads contained in the terminal container.

2. The dynamoelectric device of claim 1 wherein:
the shroud has a cylindrical inner wall, a cylindrical outer wall spaced radially outward from the inner wall, and an annular end wall that extends between the inner wall and the outer wall, the relative positions of the inner wall, outer wall and end wall giving the shroud its generally U-shaped cross-section.

3. The dynamoelectric device of claim 2, wherein:
the inner wall, outer wall and end wall are connected together as one monolithic piece.

4. The dynamoelectric device of claim 1, wherein:
the shroud and the terminal container are one monolithic piece.

5. The dynamoelectric device of claim 1, wherein:
a housing contains the stator and the terminal container projects outward from the shroud to a position outside the housing.

6. A dynamoelectric device comprising:
a stator having a center bore with a center axis extending between axially opposite ends of the stator, a plurality of stator poles circumferentially spaced around the center bore, the stator poles having wiring wrapped in windings around the stator poles and the windings having end turns arranged around the stator center bore at the axially opposite ends of the stator;
a shroud attached to one of the ends of the stator, the shroud extending around the stator center bore and having a generally U-shaped cross section that covers over the end turns of the windings;
a terminal container being integrally molded with the shroud and the windings having leads that are mounted in the terminal container; and,
a compartment is molded in the shroud and a protector that limits current in the windings and a temperature of the windings is mounted in the compartment.

7. The dynamoelectric device of claim 6, wherein:
the shroud and the compartment are one monolithic piece.

8. A dynamoelectric device comprising:
a stator having a center bore with a center axis extending between axially opposite ends of the stator, a plurality of stator poles circumferentially spaced around the center bore, the stator poles having wiring wrapped in windings around the stator poles and the windings having end turns arranged around the stator center bore at the axially opposite ends of the stator;
a shroud attached to one of the ends of the stator, the shroud extending around the stator center bore and having a generally U-shaped cross section that covers over the end turns of the windings;
a terminal container being integrally molded with the shroud and the windings having leads that are mounted in the terminal container; and,
a plurality of posts project axially from the shroud to positions between adjacent stator poles.

9. The dynamoelectric device of claim 8, wherein:
the shroud and the plurality of posts are one monolithic piece.

10. An apparatus for containing end turns of a stator winding at one end of a plurality of stator poles and away from a center bore surrounded by the plurality of stator poles, the apparatus comprising:
an annular shroud that is dimensioned to fit against the one end of the plurality of stator poles, the shroud having a center opening that is at least as large as the stator center bore, the shroud having a generally U-shaped cross-section and an interior volume that receives the end turns of the stator winding therein when the shroud is fit against the one end of the plurality of stator poles;
a terminal container being integrally molded with the shroud, the terminal container having at least one mount to receive a lead of the stator winding when the shroud is fit against the one end of the plurality of stator poles and a terminal container top removably attachable to the terminal container to cover over the winding lead received in the terminal container.

11. The apparatus of claim 10, wherein:
the shroud has a cylindrical inner wall around the center opening and a cylindrical outer wall that is spaced radially outward from the inner wall, the inner wall and outer wall receiving the end turns of the stator winding therebetween when the shroud is fit against the one end of the plurality of stator poles.

12. The apparatus of claim 11, wherein:
an annular end wall extends between the inner wall and the outer wall and together with the inner wall and outer wall gives the shroud its generally U-shaped cross section.

13. The apparatus of claim 12, wherein:
the inner wall, outer wall and end wall are connected together as one monolithic piece.

14. The apparatus of claim 10, wherein:
the shroud and the terminal container are one monolithic piece.

15. An apparatus for containing end turns of a stator winding at one end of a plurality of stator poles and away from a center bore surrounded by the plurality of stator poles, the apparatus comprising:
an annular shroud that is dimensioned to fit against the one end of the plurality of stator poles, the shroud having a center opening that is at least as large as the stator center bore, the shroud having a generally U-shaped cross-section and an interior volume that receives the end turns of the stator winding therein when the shroud is fit against the one end of the plurality of stator poles;
a terminal container being integrally molded with the shroud, the terminal container having at least one mount to receive a lead of the stator winding when the shroud is fit against the one end of the plurality of stator poles; and,
a protector compartment is attached to the shroud and is dimensioned to receive a protector that limits current in the stator windings and a temperature of the stator windings.

16. The apparatus of claim 15, wherein:
the shroud and the protector container are one monolithic piece.

17. An apparatus for containing end turns of a stator winding at one end of a plurality of stator poles and away from a center bore surrounded by the plurality of stator poles, the apparatus comprising:
an annular shroud that is dimensioned to fit against the one end of the plurality of stator poles, the shroud having a center opening that is at least as large as the stator center bore, the shroud having a generally U-shaped cross-section and an interior volume that receives the end turns of the stator winding therein when the shroud is fit against the one end of the plurality of stator poles;

a terminal container being integrally molded with the shroud, the terminal container having at least one mount to receive a lead of the stator winding when the shroud is fit against the one end of the plurality of stator poles; and, a plurality of posts project from the shroud in positions on the shroud that will position each post between adjacent stator poles of the plurality of stator poles when the shroud is fit against the one end of the plurality of stator poles.

18. The apparatus of claim 17, wherein:

the shroud and the plurality of posts are one monolithic piece.

19. An apparatus for containing end turns of a stator winding at one end of a plurality of stator poles and away from a center bore surrounded by the plurality of stator poles, the apparatus comprising:

an annular shroud that is dimensioned to fit against the one end of the plurality of stator poles, the shroud having a center opening that is at least as large as the stator center bore, the shroud having a generally U-shaped cross-section and an interior volume that receives the end of the stator winding therein when the shroud is fit against the one end of the plurality of stator poles; and a circuitry compartment being integrally molded with the shroud, the circuitry compartment having at least one shoulder inside the circuitry compartment providing a seating surface for a sensing device of the stator when the shroud is fit against the one end of the plurality of stator poles.

20. The apparatus of claim 19, wherein:

the circuitry compartment is dimensioned to receive a protector of the stator that limits current in the stator windings and a temperature of the stator windings.

21. The apparatus of claim 19, wherein:

the shroud has a cylindrical inner wall around the center opening and a cylindrical outer wall that is spaced radially outward from the inner wall, the inner wall and the outer wall receiving the end turns of the stator winding therebetween when the shroud is fit against the one end of the plurality of stator poles.

22. The apparatus of claim 21, wherein:

an annular end wall extends between the inner wall and the outer wall and together with the inner wall and outer wall gives the shroud its generally U-shaped cross-section and the circuitry compartment is integrally molded with the shroud end wall.

23. The apparatus of claim 19, wherein:

the circuitry compartment is recessed into the shroud.

* * * * *